INVENTORS
JOHN EARL FRAZIER and
NELSON L. MURPHY
BY their ATTORNEYS

Aug. 17, 1965   J. E. FRAZIER ETAL   3,201,219
GLASS MELTING FURNACE

Filed June 1, 1962   3 Sheets-Sheet 2

INVENTORS
JOHN EARL FRAZIER and
NELSON L. MURPHY
BY

*their* ATTORNEYS

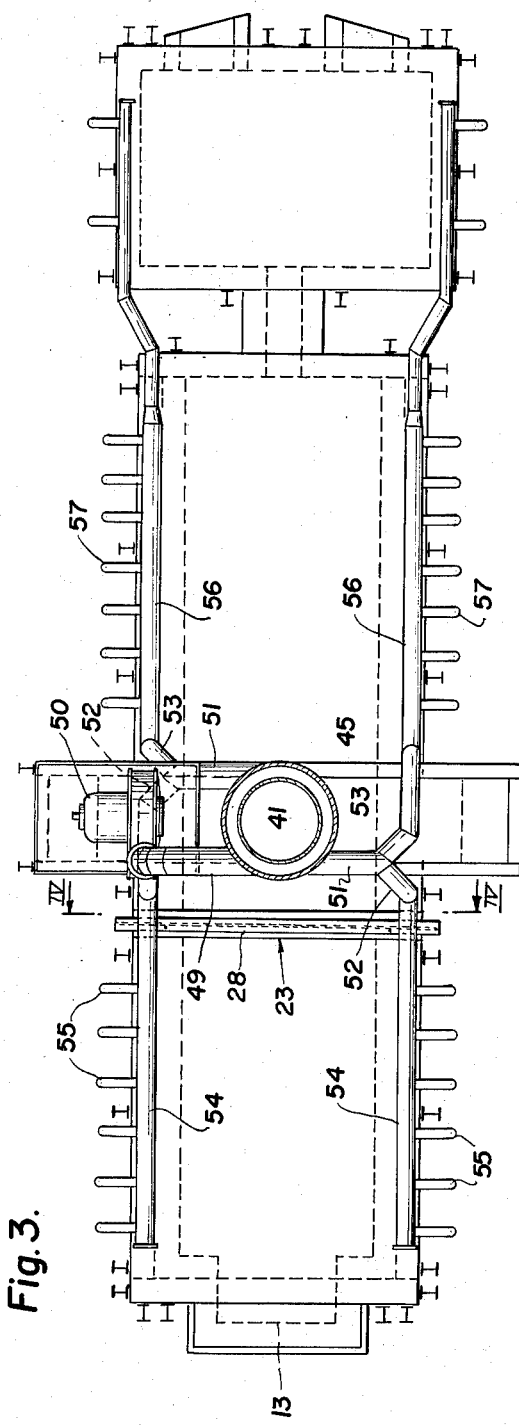
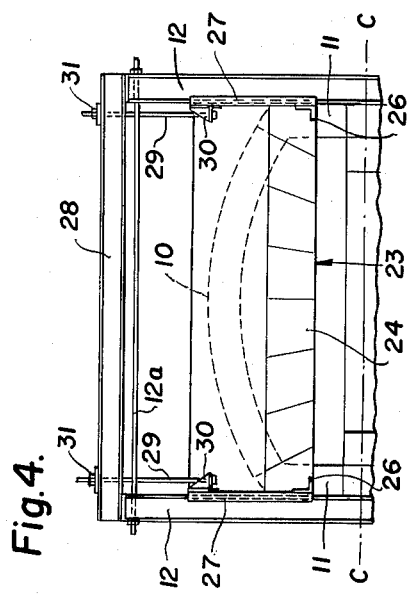

United States Patent Office 3,201,219
Patented Aug. 17, 1965

3,201,219
GLASS MELTING FURNACE
John Earl Frazier and Nelson L. Murphy, Washington, Pa., assignors to Frazier-Simplex, Inc., Washington, Pa., a corporation of Delaware
Filed June 1, 1962, Ser. No. 199,485
5 Claims. (Cl. 65—347)

This invention is for a glass melting furnace, and more particularly it relates to a furnace designed for use in the manufacture of pressed or blown glass ware, as distinguished from sheet or window, and since a machine and forming unit are arranged to operate as a unit, it is sometimes referred to as a unit melter. The invention, however, is not limited to such use and may be otherwise employed.

Like other melting furnaces used in the glass industry, the furnace of the present invention is an elongated structure with provision for charging batch materials into one end, a tank in which melting occurs and along which the glass flows toward the other end. The molten glass flows through a narrow passage under a bridge wall into a refiner or working zone from which the molten glass is removed through a forehearth. As in other furnaces, burners are positioned in the sides of the tank for burning fuel in the furnace over the glass. The present invention, however, incorporates certain improvements designed to give rapid and efficient melting, and a unique flue and stack arrangement is provided for the removal of gases and recuperation of heat therefrom. To this end the furnace tank is formed with a relatively short, shallow section at the charging end that drops off steeply into a relatively deeper main tank section, and in the combustion space over the tank there is a bridge wall which is preferably adjustable vertically, through which the hot combustion gases pass at a relatively high velocity. Beyond this bridge wall near the entering end of the main tank, opposed flues carry the combustion gases from the entire furnace laterally and then vertically. The vertical flues connect through a horizontal passage. Centered over the furnace at the center of this horizontal flue is a vertical stack with a surrounding recuperator through which air is forced in heat exchange relation to the stack, this air flowing from the bottom of the recuperator into manifolds leading to the several fuel burners. While the stack and recuperator are centered over the longitudinal axis of the furnace, the assembly is supported independently of the furnace.

A primary object of the invention is to provide a relatively cheap but efficient unit melter.

Another object of the invention is to provide a unit heater in which the batch materials are quickly melted in a shallow zone of intense heat.

Another object of the invention is to provide a unique bridge wall across the combustion chamber under which the gases from the melting zone flow.

A further object is to provide a symmetrical flue arrangement for the removal of gases from the combustion area above the tank and carry them to the stack.

A further object is to provide a combined stack and recuperator and provide for the support thereof separate from the tank and furnace.

These and other objects and advantages are secured by our invention, which may be more fully understood by reference to the accompanying drawings which show an embodiment of our invention and in which:

FIG. 3 is a top plan view of the furnace; and

FIG. 4 is a fragmentary transverse vertical section in the plane of line IV—IV of FIG. 3.

Figure 1:
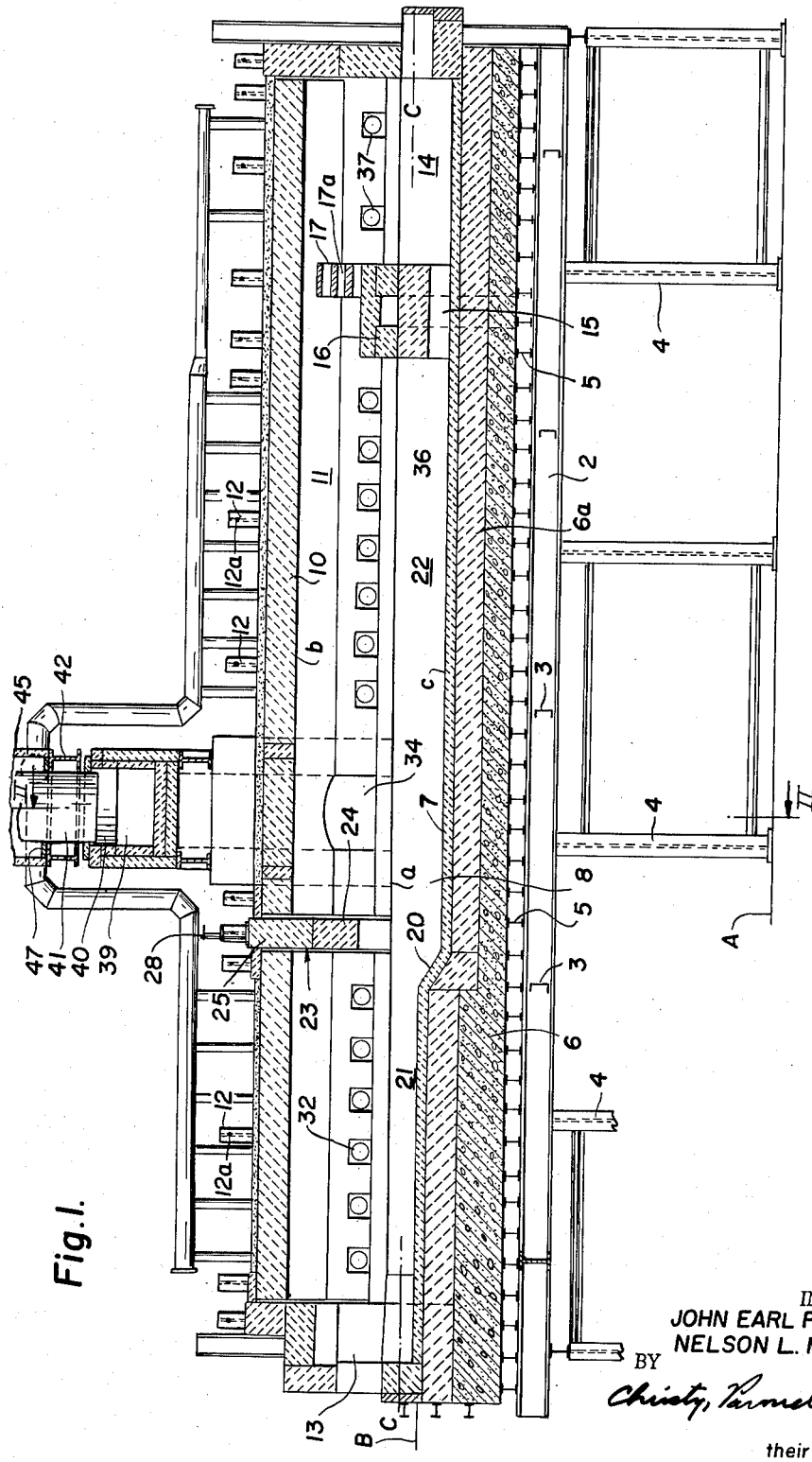
FIG. 1 is a longitudinal section through the furnace with the upper part of the stack and recuperator broken away and the lower portion thereof in elevation.

Referring to the drawings in more detail, line A represents the level of the working floor of a glass plant, and line B represents the level of the charging floor. In accordance with usual practice, the tank of the furnace is elevated above the working floor, and is carried on longitudinally-extending girders 2 and cross beams 3 supported on structural framework 4. Carried on the girders 2 are other closely spaced parallel beams or structural sections 5 providing the immediate underlying support for the furnace itself.

Figure 2:
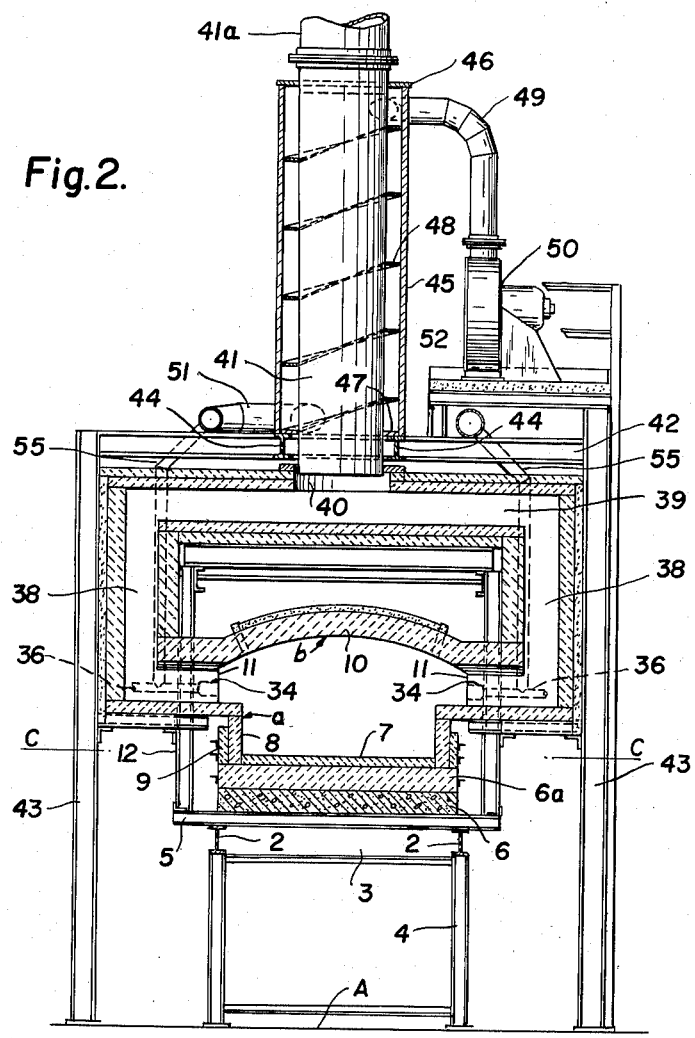
FIG. 2 is a transverse vertical section in the plane of line II—II of FIG. 1, but with the stack in elevation.

As best seen in FIGS. 1 and 2 the furnace has a base slab 6 of refractory concrete above which is a layer of refractory insulation. Upon this is formed the tank formed of tank blocks 7 and 8 generally used in glass melting furnaces. The tank blocks form the bottoms and blocks 8 the sides.

In FIG. 2 the line C—C represents the top line of the tank blocks. Outside the walls 8 are refractory walls 9. Above the tank there is a combustion chamber which may be somewhat wider than the tank. It comprises a refractory roof arch 10 carried on side walls 11 extending upwardly from the tank blocks. Structural metal buckstays 12 extend at intervals up each side of the furnace structure from the bottom supporting sections 5 to a level above the top of the arch, and the upper ends of the buckstays 12 along one side are tied by tie rods such as 12a to the buckstays along the other side to brace the sides of the furnace. All of this general structure is known to the industry and is not itself novel.

Also, as is usual in the art, one end of the furnace, which in FIGS. 1 and 3 is the left end, has a specially designed opening 13 for the introduction of batch material from the charging floor B, this arrangement 13 being known in the art as the "dog-house." The opposite end of the furnace, i.e., the right end in the instant drawings, is the working end or refiner 14 of the furnace, and as shown in FIG. 3 is slightly wider than the intermediate portion of the furnace. Also, as best seen in FIGS. 1 and 3, there is a narrow submerged connecting passage 15 leading under double bridge walls 16 and 17 from the main intermediate section of the tank to the working end. This passage is often called in the art the "throat" and is submerged below the normal glass level in the tank so that floating impurities cannot flow into the working end, and is of narrow width so as to secure better temperature control of the glass at the working end, and incidentally retard the wash of flowing glass along the sides of the tank.

Such is the general construction of the furnace to which the present invention pertains. According to the present invention the tank has a relatively deep and steep drop-off or step 30 in the bottom thereof so that depth of the tank from the charging end inwardly to the drop-off is relatively shallow. The length of the melting zone 21 provided by this shallow depth is substantially shorter than the distance from the step or drop-off to the throat, this deeper main tank area being designated 22.

At about the place where the depth of the tank increases there is a transverse bridge wall or baffle wall, designated generally as 23. As best seen in FIG. 4, the lower portion comprises a flat arch 24 formed of interfitted keyed blocks above which is a refractory wall 25 that may be formed of refractory brick. The ends of the flat arch are supported at the outside of the furnace on angle sections 26 carried on side sections or shoes 27 slidable on two opposite buckstays 12. These particular stays carry a cross beam 28 at the tops thereof. A rod 29 is suspended from the cross section 28 near each end, each rod being connected to one of the shoes at 30. The upper end of each rod is threaded and is provided with a nut 31.

The bridge wall or baffle 23 is received in a transverse opening in the top and sides of the combustion chamber, and being independent of the top and sides, and being suspended in the manner described, it may be adjusted vertically within the necessary limits by turning the nuts 31. The bottom of the bridge wall is always above the level of the glass in the tank, the usual depth of which is about the level of line C—C.

In the side walls of the combustion chamber along the melting zone are opposed fuel burners 32. With these burners an atmosphere of burning gases is maintained in the combustion chamber over the melting zone of the tank, and these gases in flowing from this part of the combustion chamber, are forced downwardly by the bridge wall or baffle 23 against the surface of the glass flowing out of the melting zone, the gases after flowing under the wall 23 entering the combustion zone of the main tank immediately behind said wall, and being removed therefrom through ports leading to outlet flues, hereinafter described. By adjusting the burners and the level of the wall 23 the flow of gases from above the melting area of the tank can be controlled to assure effective turbulence and positive pressure in the melting zone.

In the side walls of the combustion chamber over the main section of the tank, preferably at a location closely adjacent the baffle 23, are opposed outlet ports 34 for combustion gases. Beyond the outlet ports both of the side walls of the combustion chamber along the main tank area are provided with fuel burners 36. In addition there are fuel burners 37 in the side walls of the working end, and the combustion chamber over the working end communicates with the combustion chamber over the main zone of the tank because of the double bridge wall 16–17, the lower edges of which are submerged, but the upper edges of which are below the roof arch, and in addition the upper portion of one or both may be ported, as indicated at 17a.

As best seen in FIG. 2, the opposed burned gas outlet ports 34 in the side walls each open into the lower end of a vertical heat insulated or refractory lined flue 38, there being one such flue up each side of the furnace. The upper ends of the vertical flues terminate in a common cross flue 39 above the roof of the combustion zone. At the center of the top of the cross flue there is an opening 40 into which the lower end of metal stack section 41 projects.

This metal stack section projects down between two parallel spaced transverse beams 42 carried on vertical structural columns 43 that extend up from the working floor and are independent of the other steel or structural framework of the furnace. The beams 42 are connected to each other by two metal sections or braces 44, one at each side of the stack, and substantially tangent thereto.

Concentrically spaced about the stack section 41 is a cylindrical shell 45, and the space at the top of the shell around the stack is closed by an annulus 46 welded to the stack section 41 and to the top of the shell. There is a similar annulus 47 at the bottom of the shell also welded to the shell and the stack section 41. This bottom annulus 47 rests on the tops of beams 42 and braces 44, transmitting the weight of the stack and its surrounding shell entirely to the beams 42 and the columns 43, thus making the support of the stack and its associated parts independent of the furnace, and relative expansion and contraction can take place without introducing stresses from this cause.

Inside the shell 45 around the stack section 41 there is a continuous helical baffle 48. At the upper end of the shell a duct 49 opens tangentially into the space above the baffle. This duct leads upwardly from the outlet of a blower 50 supported on the beams 42 at one side of the stack. At the bottom of the space between the stack and the shell there are oppositely-directed similar outlet ducts 51, each opening tangentially into said space at diametrically opposite positions. One duct 51 extends transversely to one side of the furnace and one to the other. Each has two branches 52 and 53 at its outer end. Branch 52 leads to a manifold 54 from which are downwardly-extending pipes 55 carrying combustion air to the burners of the melting section. Branch 53 connects with manifold pipes 56 from which extend individual pipes 57 similar to 56 to carry air to the burners along the sides of the main tank and the working zone.

Air is forced by the blower 50 through duct 49 into the top of the space around the metal stack section, and by reason of the helical baffle, circulates around the stack several times as it flows down to the ducts 51 and to the several burners. Since the combustion gases moving up the stack are highly heated, there is provided by this structure a heat exchanger for preheating the combustion air to the burners, and a substantial amount of the heat is recuperated through this arrangement. The blower 50, being supported on the separate framework comprising beams 42 and columns 43 is close to the top of the heat exchanger, so that the duct 49 is short, but vibration from the blower is not transmitted to the furnace. The stack section 41 may have one or more additional sections 41a thereon to reach a desired height.

The invention provides a simple but efficient unit melter. It is particularly effective by having a relatively short, shallow melting zone where batch materials are quickly melted, followed by a deeper, longer aging or fining zone where the molten mix refines under comparatively more quiescent conditions. The effectiveness of this arrangement is increased through the use of the baffle 23 across the combustion space between the melting zone and the main zone, giving more control of combustion conditions in the two zones. A desirable condition is provided through the removal of all combustion gases through the opposing side ports just to the rear of the baffle. Short flues convey these gases to the stack with low heat loss. The hot gases in the stack transfer their heat to the incoming air. Because the stack is centrally positioned on the longitudinal axis of the furnace, the structure is symmetrical and parts can be duplicated. While the stack and heat exchanger are centrally positioned, they are supported independently of the furnace, but little additional work floor space is utilized because of this.

While we have disclosed and specifically described one specific structure embodying our invention, it is to be understood that this is by way of illustration and various changes in the construction may be made within the contemplation of the invention.

We claim:

1. A glass melting furnace comprising a tank having a bottom and sides, an enclosure above the tank comprising sides and a roof forming a combustion chamber over the tank, the furnace having means at one end through which batch materials are charged into the tank, the tank having a melting zone at the charging end, a main zone into which glass flows from the melting zone and a refiner at the other end of the main zone, there being a submerged passage from the main zone to the refiner, the bottom of the tank in the melting zone being at a level appreciably above the level of the bottom in the main zone and refiner with the bottom having a steep drop from the melting zone to the main zone, the bottom of the tank in all of the zones being at a level to provide a level pool of molten glass in the tank from one end of the entire tank to the other with a change of depth in the pool at said steep drop, a transverse baffle across the combustion chamber with its lower edge above the level of the pool of glass maintained throughout the length of the tank, said baffle being located where the melting zone drops off into the main zone, fuel burners in the side walls of the enclosure along the melting zone above the tank, the side walls of the enclosure along the main zone and refiner above the tank, the furnace having opposed burned gas outlet ports in the side walls above the tank only in the main zone close to the baffle through which burned gases from all of the burners are removed, whereby gases from the melting zone travel rearwardly of the furnace away from the charging end under said baffle to said ports, and gases from the other burners travel forwardly toward said baffle to said ports with all of the gases being exhausted near the forward end of the main zone close to the baffle and remote from the refiner.

2. A glass melting furnace as defined in claim 1 wherein said baffle is adjustable vertically relative to the tank to regulate the gas passage over the glass from the melting zone to the outlet ports.

3. A glass melting furnace as defined in claim 1 in which said transverse baffle is received in a transverse opening in the roof and side walls of the enclosure, supporting means at each end of the baffle on which the baffle is supported independently of the said enclosure, and means for adjusting the supporting means vertically to regulate the gas passage over the glass from the melting zone to the outlet ports.

4. A glass melting furnace as defined in claim 1 in which each of said waste gas ports opens into a vertical flue, a transverse flue above the roof of the enclosure connecting the tops of the vertical flues, a stack section opening vertically into the center of the transverse flue, and structural means over and at each side of the furnace for supporting the weight of the stack section independently of the furnace enclosure and said flues.

5. A glass melting furnace as defined in claim 1 in which each of said waste gas ports opens into a vertical flue, a transverse flue above the roof of the enclosure connecting the tops of the vertical flues, a stack section opening vertically into the center of the transverse flue, structural means over and at each side of the furnace for supporting the weight of the stack section independently of the furnace enclosure and said flues, a shell surrounding the stack section and spaced therefrom, means at the top and bottom of the shell closing said space between the shell and the stack, structural means extending over the roof of the furnace above said transverse flue and down alongside each side of the furnace on which the stack and surrounding shell are mounted and supported independently of the furnace enclosure and tank, means for forcing air into the top of said space between the shell and the stack section, transverse ducts extending from the bottom of said space in opposite directions, and manifolds extending lengthwise of the furnace at each side with one duct connected with the manifolds at one side and the other duct connected with the manifolds at the other side, said manifolds having individual ducts extending downwardly therefrom, one to each of the burners along the sides of the furnace.

References Cited by the Examiner

UNITED STATES PATENTS

| 1,999,762 | 4/35 | Howard | 65—347 X |
| 2,078,795 | 4/37 | Forter | 65—347 X |
| 2,110,736 | 3/38 | Morton | 65—347 X |
| 2,122,469 | 7/38 | Hitner | 65—347 X |

DONALL H. SYLVESTER, *Primary Examiner.*